(12) United States Patent
Cooper

(10) Patent No.: US 8,240,610 B1
(45) Date of Patent: Aug. 14, 2012

(54) EMERGENCY SAFETY JACKET

(76) Inventor: Corey Cooper, Mobile, AL (US)

( * ) Notice: Subject to any disclaimer, the term of this patent is extended or adjusted under 35 U.S.C. 154(b) by 519 days.

(21) Appl. No.: 12/555,613

(22) Filed: Sep. 8, 2009

Related U.S. Application Data

(60) Provisional application No. 61/191,221, filed on Sep. 8, 2008.

(51) Int. Cl.
*B64D 17/00* (2006.01)
*B64D 10/00* (2006.01)
*G21F 3/02* (2006.01)

(52) U.S. Cl. ............... 244/143; 244/142; 2/2.14; 2/456

(58) Field of Classification Search .................. 244/142, 244/147, 148, 149, 150, 143
See application file for complete search history.

(56) References Cited

U.S. PATENT DOCUMENTS

| | | | | |
|---|---|---|---|---|
| 1,849,628 A | * | 3/1932 | Lemercier | 244/143 |
| 2,290,218 A | * | 7/1942 | Vosseller | 244/143 |
| 2,869,809 A | * | 1/1959 | Gregory | 244/148 |
| 3,550,159 A | | 12/1970 | Alarco | |
| 3,634,889 A | * | 1/1972 | Rolsten | 2/2.5 |
| 4,059,852 A | | 11/1977 | Crane | |
| 4,117,552 A | | 10/1978 | Simpson | |
| 4,195,362 A | | 4/1980 | Rolando | |
| 4,441,211 A | | 4/1984 | Donzis | |
| 4,602,385 A | | 7/1986 | Warren | |
| 4,694,505 A | | 9/1987 | Flosi et al. | |
| D296,030 S | | 6/1988 | Cressy-Renoma | |
| 4,825,469 A | | 5/1989 | Kincheloe | |
| 4,884,295 A | | 12/1989 | Cox | |
| 5,072,727 A | * | 12/1991 | Aronne | 128/202.11 |
| 5,325,537 A | | 7/1994 | Marion | |
| 5,593,111 A | | 1/1997 | Jackson et al. | |
| D426,050 S | | 6/2000 | Bowen | |
| 2003/0146348 A1 | * | 8/2003 | Douglas et al. | 244/151 R |
| 2008/0173764 A1 | * | 7/2008 | Oh | 244/143 |

* cited by examiner

*Primary Examiner* — Joshua J Michener
(74) *Attorney, Agent, or Firm* — Montgomery Patent & Design, LLC; Robert C. Montgomery; Joseph T. Yaksich

(57) ABSTRACT

An emergency safety jacket equipped with a rear ejecting parachute to protect an operator against forward accidental impact when riding a motorcycle-type vehicle is herein disclosed. The safety jacket comprises a back-mounted parachute being manually activated and ejected rearward using a propelling device, thereby removing the operator off the rear of the vehicle. The safety jacket also comprises a padded long-sleeve design with an outer shell which provides enhancements to protect the operator from impact, abrasion, and fire. The emergency safety jacket is specifically envisioned for use with motorcycle and scooter type vehicles.

16 Claims, 6 Drawing Sheets

EMERGENCY SAFETY JACKET

RELATED APPLICATIONS

The present invention was first described in U.S. Provisional Patent Application No. 61/191,221 filed on Sep. 8, 2008, the entire disclosures of which are incorporated herein by reference.

FIELD OF THE INVENTION

The present invention relates generally to protective outerwear, and in particular, to a jacket with enhanced protective material construction and safety parachute ejection capabilities intended for use in reducing injuries associated with the operation of personal recreation vehicles such as motorcycles, ATVs, and jet skis.

BACKGROUND OF THE INVENTION

Personal recreational vehicles such as motorcycles, ATVs, and jet skis are an increasingly popular way to spend recreational time. The use of protective gear is one of the most important aspects of personal vehicle operation. The use of such gear when riding motorcycles, for example, greatly helps to reduce the risk of serious injury or death. While the use of protective headgear such as helmets is widespread, there is a paucity of effective gear for the protection of a rider's body and torso area. Many accidents involve physical contact of the upper body area, whether from collision with standing objects or the skidding resultant from being thrown off of a vehicle such as a motorcycle or ATV. Also, many accidents involving motor vehicles are a result of unavoidable collisions when the rider either encounters an unexpected obstacle or loses control of the vehicle in some manner. Accordingly, there exists a need for a means by which suitable anti-impact protection can be provided for the torso area of riders of motorized land or water based recreational vehicles on a personal basis, and a need for a means by which impending collisions can be avoided.

Various attempts have been made to provide an apparatus for protection of the body of a motor vehicle operator. Examples of these attempts can be seen by reference to several U.S. patents. U.S. Pat. No. 3,550,159, issued in the name of Alarco, describes an impact-absorbent cellular structure intended for use as protective wear for protecting people from being forcibly thrown against other persons or objects. The Alarco apparatus utilizes air pockets to absorb the brunt of initial impact of the wearer with an external person or object.

U.S. Pat. No. 4,694,505, issued in the name of Flosi et al., describes an apparatus utilized as an upper body protector for off-road riders. The Flosi apparatus provides rigid partitions in the manner of an exoskeleton to provide the user with upper body protection, augmented by padded lining and straps for connecting and securing the protective components of the apparatus.

U.S. Pat. No. 5,593,111, issued in the name of Jackson et al., describes a system for removing a rider from a vehicle in the event of a crash or expulsion by means of a drag reducing device. The Jackson apparatus comprises a harness system with integral transmitter and receiver system which initiates deployment.

Additionally, ornamental designs for a protective jacket exist, particularly U.S. Pat. Nos. D 296,030 and D 426,050. However, none of these designs are similar to the present invention.

While these devices fulfill their respective, particular objectives, each of these references suffer from one or more of the aforementioned disadvantages. Many such apparatuses are not ergonomic in a manner that permits fully unimpeded movement to the user. Also, many such apparatuses fail to protect the full extent of the user's upper body in the event of impact. Furthermore, many such apparatuses do not provide a satisfactory means by which a rider can avoid impending collisions and adequately protect themselves during expulsion from a moving vehicle. Accordingly, there exists a need for protective upper body outerwear without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to protect the upper body area of a rider during collisions and expulsion from a personal recreational vehicle. Thus, the object of the present invention is to solve the aforementioned disadvantages and provide for this need.

To achieve the above objectives, it is an object of the present invention to provide an emergency safety jacket comprising a rear-mounted deployable parachute, an ignition activated propellant device, and a release lever. The jacket is to comprise a padded long-sleeve jacket design with an outer flame retardant shell to help protect the rider from fire, abrasion, and impacts.

Another object of the present invention is to further comprise the emergency safety jacket of a jacket shell, a pair sleeves, a sleeve attachment means, a front zipper, a plurality of buckle closures, a release module, and a plurality of abrasion inserts. The jacket shell is intended as a heavily padded sport garment with additional protection provided via the sewn-in abrasion inserts, which are located to help protect from impact at the elbows, shoulders, and the like.

Yet still another object of the present invention is to provide closure buckles for the jacket shell, comprising horizontally activated latching devices equally spaced along the zipper. These buckles are intended to provide maximum closure strength in order to withstand tensile forces resulting from the deployment of the parachute.

Yet still another object of the present invention is to provide a release module for the parachute, comprising a rectangular electro-mechanical device mounted onto the chest area of the jacket shell. This module is intended to provide an interface by which the rider can quickly and easily deploy the parachute.

Yet still another object of the present invention is to provide a parachute assembly, comprising a parachute pouch, a plurality of rupture seams, and a parachute. This assembly is intended to provide a means of quick deployment for a small parachute with a hemispherical canopy which is supported by a plurality of suspension lines.

Yet still another object of the present invention is to further comprise the parachute assembly of a mounting plate, plate fasteners, propellant canister fasteners, and a propellant canister. This allows the parachute assembly to be rapidly deployed via a miniature ignition and repellant system similar to those used in automotive air bags.

Yet still another object of the present invention is to provide a propellant canister, comprising an integral igniter module, canister fasteners, and propellant. The igniter module is intended to provide an internal ignition source and a primary charge to ignite the solid fuel propellant, causing the parachute to be deployed rearward.

Yet still another object of the present invention is to provide an interface portion of the release module for the parachute, further comprising of a manual release lever, an electrical switch, a battery compartment, and internal wiring, allowing the user to grasp and pull the release lever in order to induce electric current into the propellant canister and deploy the parachute.

Yet still another object of the present invention is to provide a method of utilizing the device which provides a unique means of protecting a rider of a personal recreational vehicle from various hazards such as expulsion, skidding, fire, and impact in a manner which is simple, quick, and effective.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings in which like elements are identified with like symbols and in which:

Figure 1:
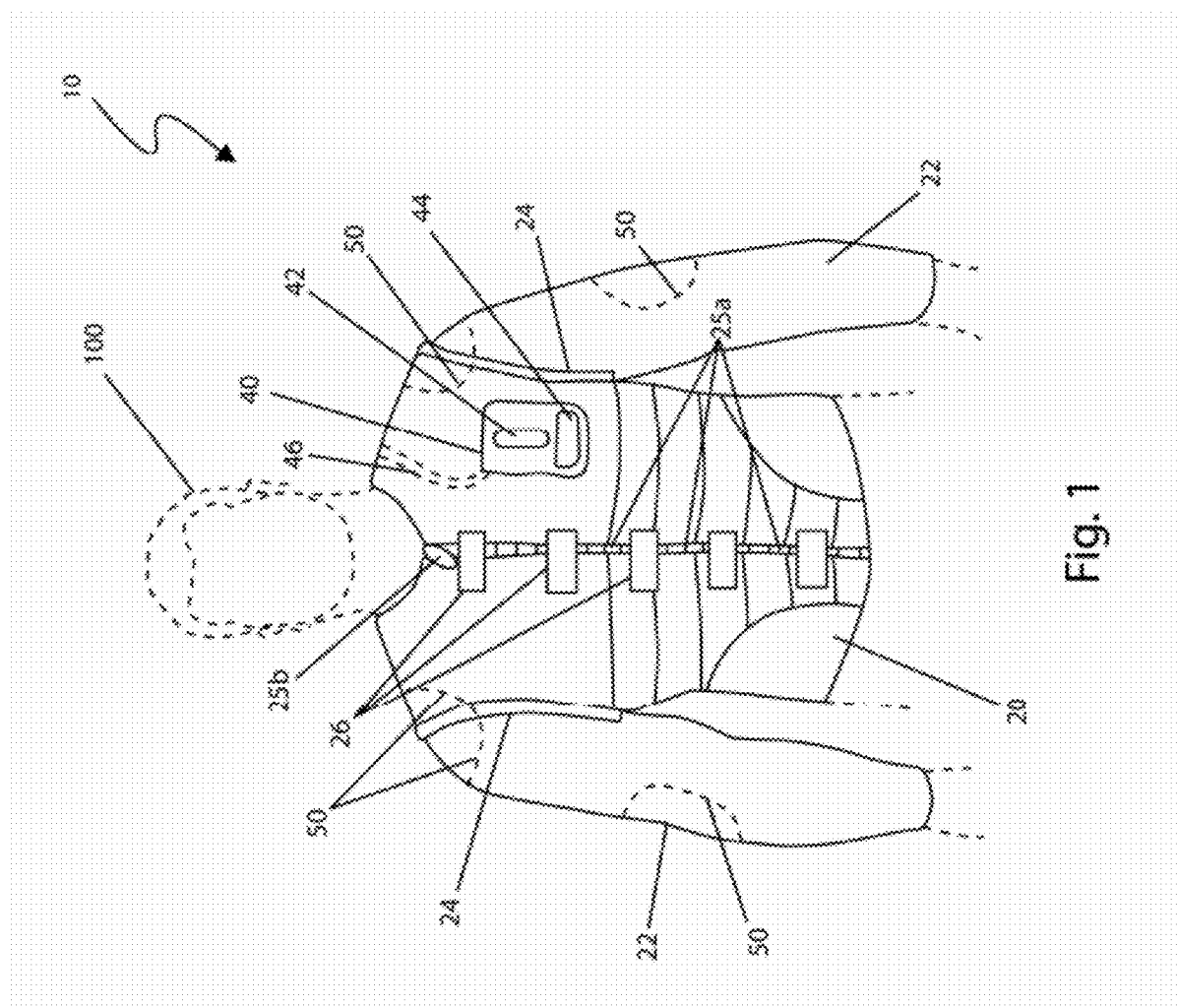
FIG. 1 is a front view of an emergency safety jacket 10, according to a preferred embodiment of the present invention.

| DESCRIPTIVE KEY | |
|---|---|
| 10 | emergency safety jacket |
| 20 | jacket shell |
| 22 | sleeve |
| 24 | sleeve attachment means |
| 25a | front zipper |
| 25b | zipper puller |
| 26 | buckle closure |
| 30 | parachute assembly |
| 32 | parachute pouch |
| 35 | rupture seam |
| 37 | parachute |
| 38 | canopy |
| 39 | suspension line |
| 40 | release module |
| 42 | release lever |
| 43 | switch |
| 44 | battery compartment |
| 45 | hinge |
| 46 | wiring |
| 47 | battery |
| 50 | abrasion insert |
| 66 | mounting plate |
| 68 | mounting plate fastener |
| 72 | igniter module |

-continued

| DESCRIPTIVE KEY | |
|---|---|
| 73 | propellant canister fastener |
| 74 | propellant canister |
| 75 | propellant |
| 100 | operator |
| 110 | vehicle |
| 115 | propelling motion |
| 120 | fastener |

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment, and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for an emergency safety jacket (herein described as the "apparatus") 10, comprising a rear-mounted deployable parachute 37 which provides protection thereto an operator 100 against possible fatal impact when riding a top-accessible vehicle 110 such as a motorcycle, scooter, all-terrain vehicle, or the like. The parachute 37 is deployed using an ignition-activated propellant device 74. In an event of an emergency, the operator 100 grasps and pulls a release lever 42 which in turn deploys the back-mounted parachute 37 causing the operator 100 to be pulled off of a rear portion of the motorcycle 110. Once propelled rearward, the parachute 37 catches air in a similar manner as a drag racing car, thereby ejecting the operator 100 in a rearward motion 115 therefrom the motorcycle 110. The apparatus 10 comprises a padded long-sleeve jacket design 20 with an outer flame retardant shell protecting the operator 100 therefrom fire, abrasion, and impact with stationary objects.

Referring now to FIG. 1, a front view of the apparatus 10, according to the preferred embodiment of the present invention, is disclosed. The apparatus 10 comprises a jacket shell 20, a pair of sleeves 22, a sleeve attachment means 24, a front zipper 25a, a plurality of buckle closures 26, a release module 40, and a plurality of abrasion inserts 50. The jacket shell 20 comprises a heavily padded sport garment further comprising protective features and materials which provide protection therefrom abrasion, impact, and fire thereto an operator 100 during use. The jacket shell 20 is envisioned being made using a laminated assembly of rugged textile materials such as, but not limited to: NOMEX™ fabric, basalt fabric, fiberglass cloth, glass wool, various foils, stone wool, inner and/or outer leather layers, and the like. Additional protection is provided via sewn-in abrasion inserts 50 along external or internal laminated surfaces of the jacket shell 20. The abrasion inserts 50 are envisioned being made using materials such as, but not limited to: aluminum, hard plastic, fiberglass, or the like, being located thereat anticipated impact areas such as elbows, shoulders, and the like. The sleeves 22 comprise removably attached arm covering members extending thereto a wrist area and being affixed thereto the jacket shell 20 along shoulder and armpit areas using a sleeve attachment means 24 such as a heavy-duty zipper, hook-and-loop fasteners, a plurality of snaps, or the like. The front zipper 25a and closure buckles 26 provide a weather-proof and secure front closure means thereto the jacket shell 20. The front zipper 25a is envisioned to be a common heavy-duty type device with a zipper puller 25b being vertically centered thereupon a front surface of the jacket shell 20 in an expected manner. The closure buckles 26 comprise horizontally activated latching devices being equally-spaced and spanning the front zipper 25a region. The closure buckles 26 provide maximum closure strength thereto a front portion of the jacket shell 20 being capable of withstanding anticipated tensile forces thereto said jacket shell 20 resulting therefrom deployment of the parachute 37. The closure buckles 26 comprises heavy-duty latching components and are envisioned to be similar thereto devices used to latch ski boots, luggage, and the like.

The release module 40 comprises a rectangular electromechanical device mounted thereto a chest area of the jacket shell 20 using attachment means such as sewing, adhesives, fasteners, or the like. The release module 40 provides an electro-mechanical human interface means required to initiate a timely deployment of the parachute portion 37 when needed (see FIG. 5).

Figure 2:
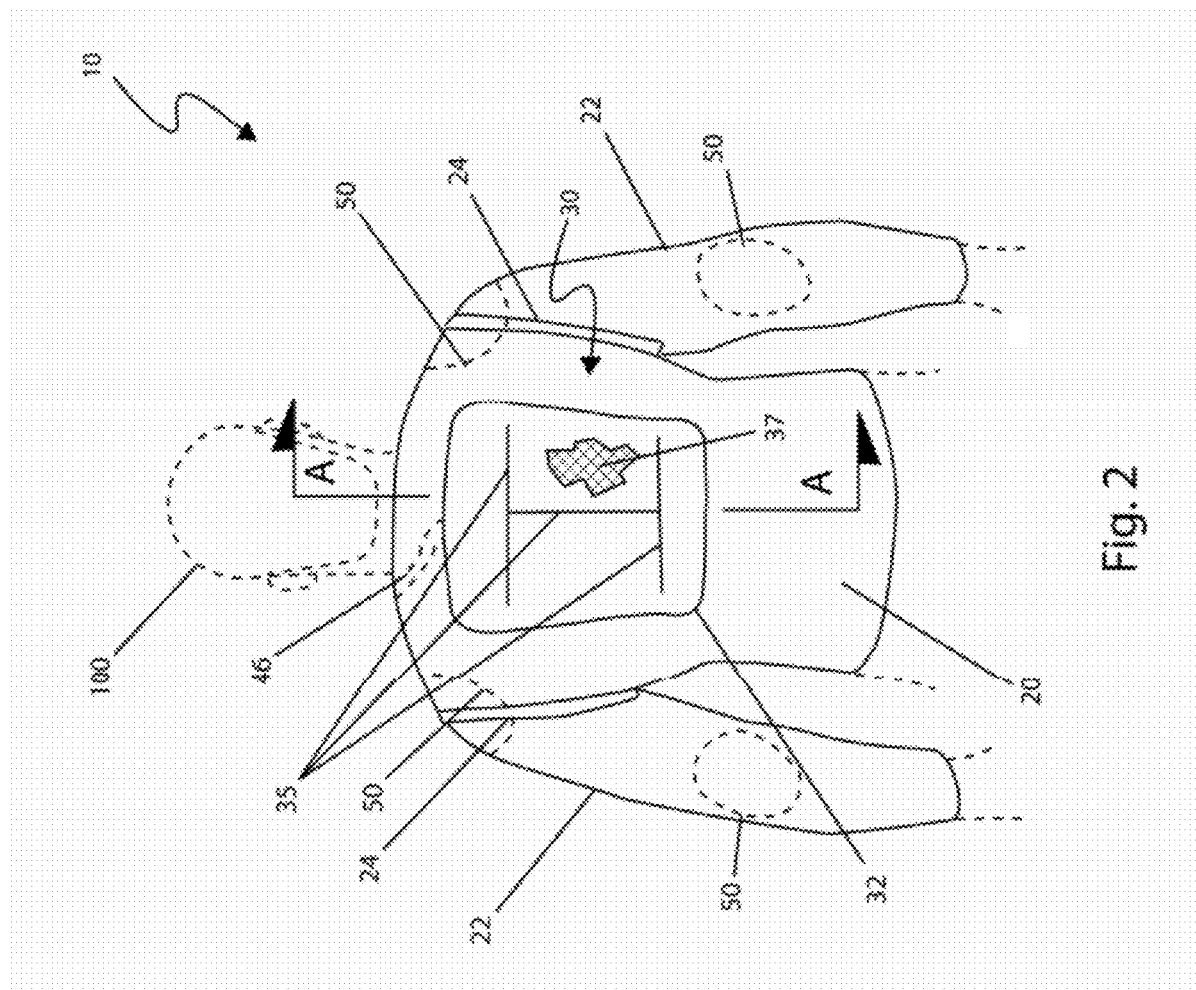
FIG. 2 is a rear view of an emergency safety jacket 10, according to a preferred embodiment of the present invention.

Referring now to FIG. 2, a rear view of the apparatus 10, according to the preferred embodiment of the present invention, is disclosed. The apparatus 10 comprises a parachute assembly 30 further comprising a parachute pouch 32, a plurality of rupture seams 35, and a parachute 37. The parachute assembly 30 provides quick deployment of a small parachute 37 with a hemispherical-shaped canopy 38 supported by a plurality of suspension lines 39 being enclosed therewithin which is envisioned to be similar to those used in the sport of base-jumping. The parachute assembly 30 is rapidly deployed via a miniature ignition/repellant system similar thereto larger units used in automotive air bag devices (see FIG. 4). During deployment, the parachute pouch 32 is pressurized causing instantaneous failure of a plurality of rear-facing rupture seams 35 along a rear surface of said pouch 32 allowing the parachute 37 to be propelled in a rearward direction (see FIG. 3). The rupture seams 35 comprise weakened intersecting linear regions envisioned to utilize a reduced thickness and are arranged therein an "H"-pattern.

Figure 3:
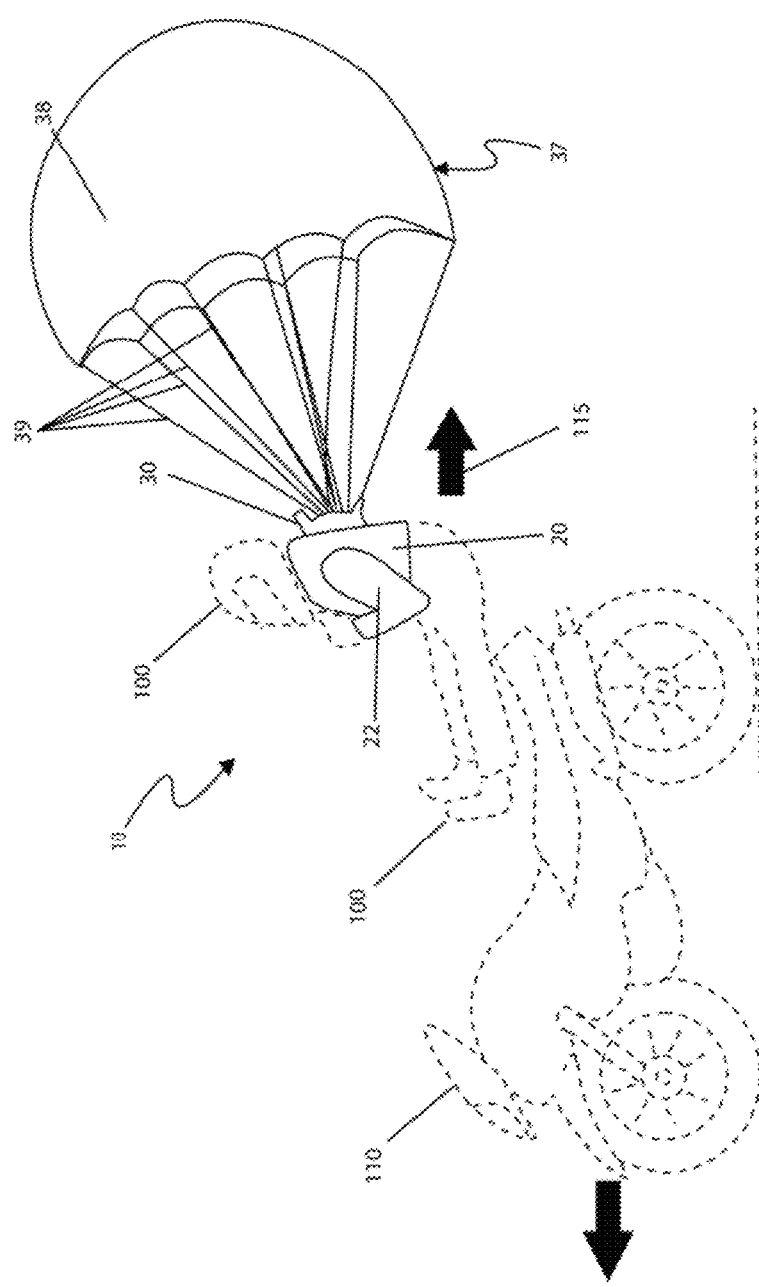
FIG. 3 is an environmental view of an emergency safety jacket 10 depicting a deployed state, according to a preferred embodiment of the present invention.

Referring now to FIG. 3, an environmental view of the apparatus 10 depicting a deployed state, according to a preferred embodiment of the present invention, is disclosed. The apparatus 10 comprises a parachute 37 which when propelled rearward, captures a flow of air, thereby deploying said parachute 37 and causing the operator 100 to be ejected therefrom the moving vehicle 110 in a horizontal rearward direction 115, thereby causing rapid deceleration of the operator's 100 forward velocity before making contact therewith a ground surface. The canopy portion 38 of the parachute 37 is envisioned to be made using similar materials and construction as common hemispherical parachute units used for drag racing cars and skydiving use. The parachute 37 is envisioned being approximately six (6) to ten (10) feet in diameter being capable of producing a desired air-resistance force so as to sufficiently decelerate an adult operator 100, thereby minimizing abrasion injuries and a likelihood of impact therewith stationary objects by said operator 100.

Figure 4:
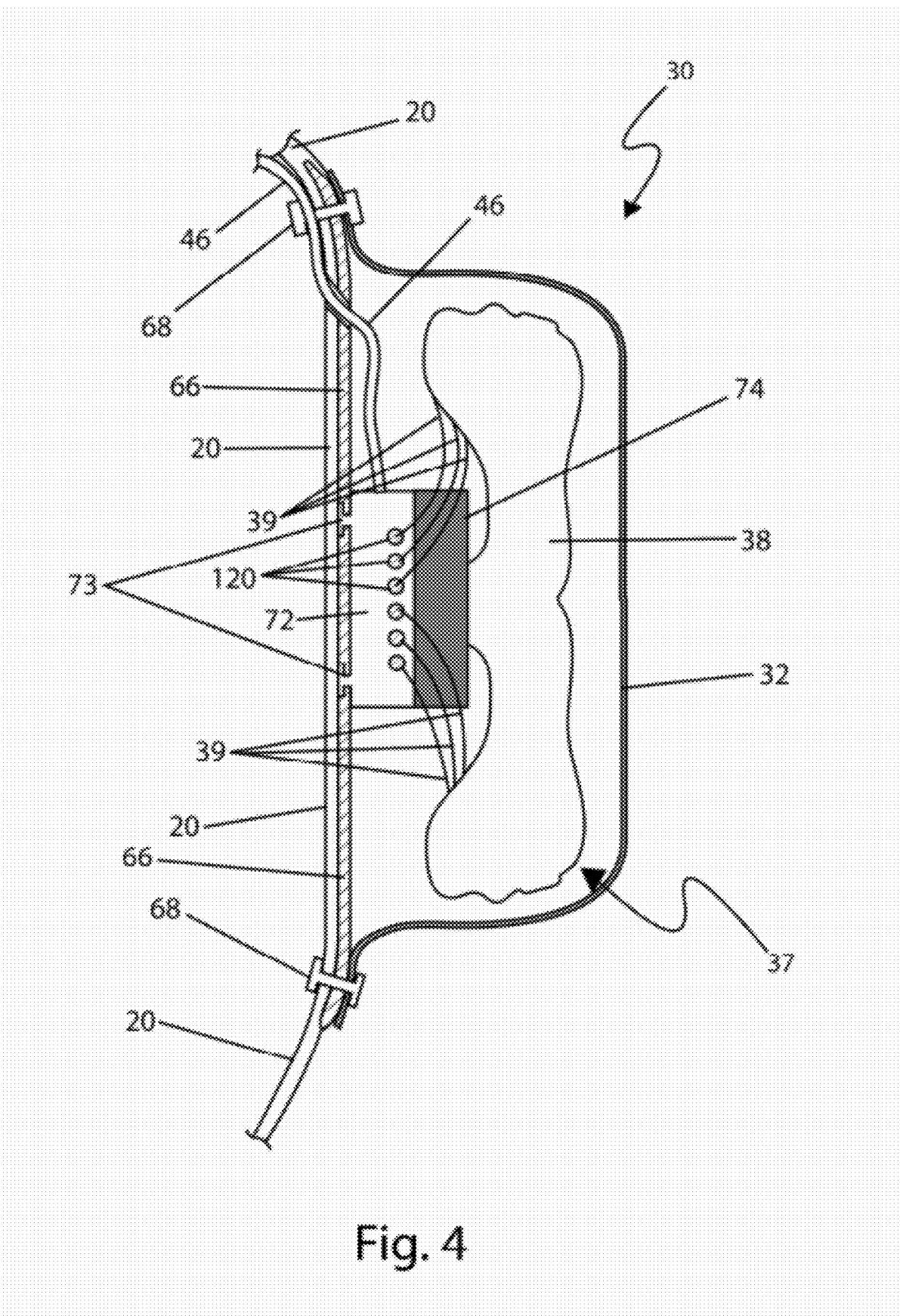
FIG. 4 is a section view of a parachute assembly portion 30 of the emergency safety jacket 10 taken along section line A-A (see FIG. 2), according to a preferred embodiment of the present invention.

Referring now to FIG. 4, a section view of a parachute assembly portion 30 of the emergency safety jacket 10 taken along section line A-A (see FIG. 2), according to a preferred embodiment of the present invention, is disclosed. The apparatus 10 comprises a parachute assembly 30 further comprising a mounting plate 66, a plurality of mounting plate fasteners 68, a plurality of propellant canister fasteners 73, and a propellant canister 74. The parachute assembly 30 is rapidly deployed via a miniature ignition/repellant system similar thereto larger units used in automotive air bag devices. During deployment, an electrical current is received by the propellant canister 74 via internal wiring 46 therefrom a manually activated switch 43 (see FIG. 5). The propellant canister 74 further comprises an integral igniter module 72, a plurality of propellant canister fasteners 73, and a volume of propellant 75. The igniter module 72 comprises an internal ignition source and a primary charge in a conventional manner to ignite the solid fuel propellant 75 therewithin the propellant canister 74 which in turn produces rapidly expanding nitrogen gas causing the parachute 37 to be propelled in a rearward direction. The propellant canister fasteners 73 secure said propellant canister 74 thereto the mounting plate 66 being capable of withstanding tensile forces applied during deployment of the parachute 37. The propellant canister 74 provides an attachment means thereto the suspension line portions 39 of the parachute 37 being fastened thereto side surfaces of the igniter module portion 72 using a plurality of fasteners 120.

The mounting plate 66 is positioned therebetween the propellant canister 74 and a back portion of the operator 100, thereby providing a means to distribute internal forces and protect the operator 100 as the propellant 75 is ignited. Said mounting plate 66 comprises a rugged plate approximately one-quarter (¼) to one-half (½) inch thick made using materials such as aluminum, fiberglass, acrylonitrile butadiene styrene (ABS), or the like. The mounting plate 66 is to be integrally sewn thereinto a rear face of the jacket shell 20 and further affixed thereto using a plurality of mounting plate fasteners 68. The mounting plate fasteners 68 provide a joining means securing the parachute pouch 32, the mounting plate 66, and the jacket shell 20 thereto each other.

Figure 5:
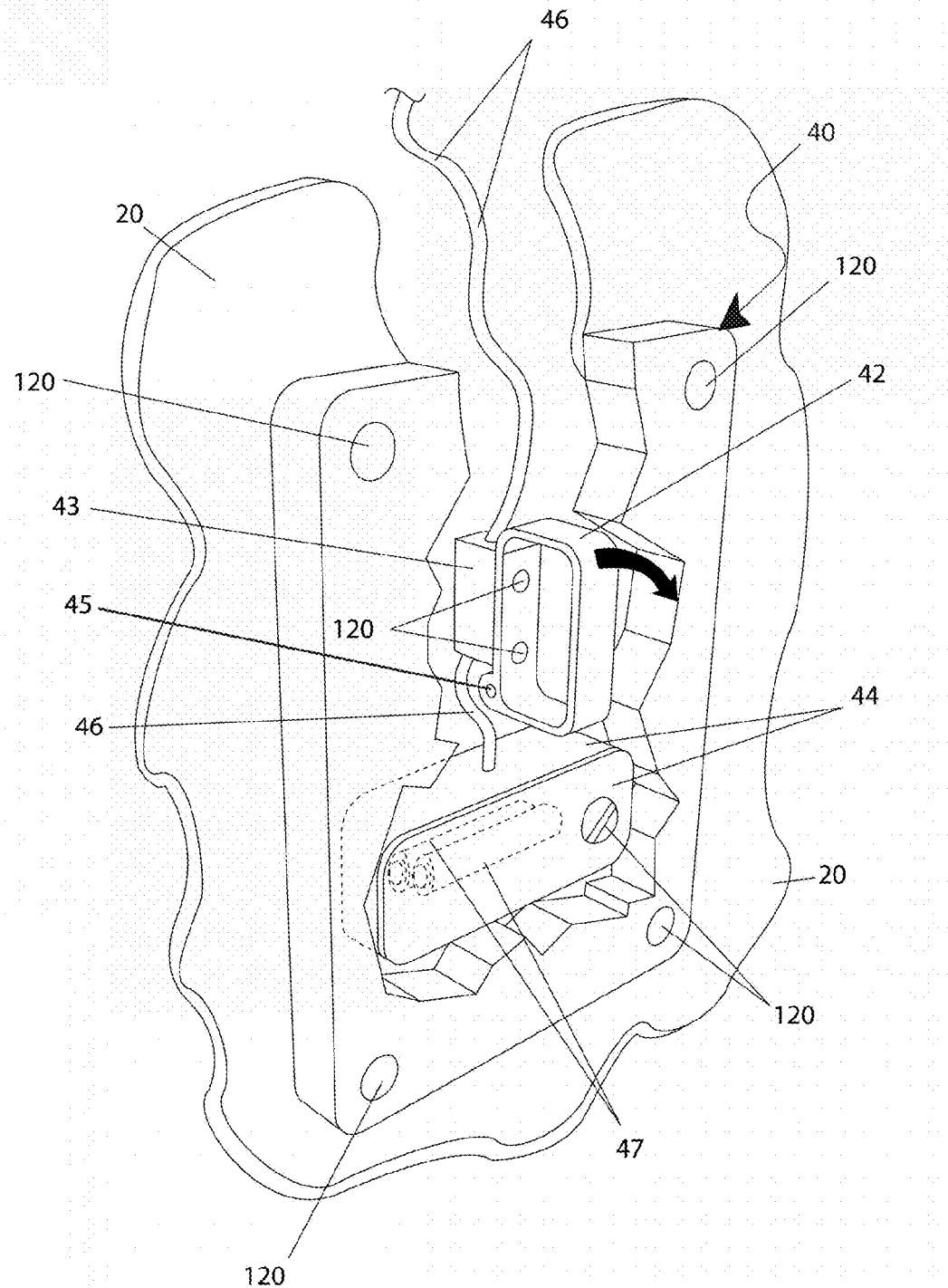
FIG. 5 is a close-up view of a release module portion 40 of the emergency safety jacket 10, according to a preferred embodiment of the present invention.

Referring now to FIG. 5, a close-up view of a release module portion 40 of the emergency safety jacket 10, according to a preferred embodiment of the present invention, is disclosed. The release module 40 comprises a rectangular electro-mechanical device mounted thereto a chest area of the jacket shell 20 preferably using common fasteners 120 such as rivets, screws, or the like. The release module 40 provides an electro-mechanical human interface means required to initiate a timely deployment of the parachute portion 37 when needed (see FIG. 5). The release module 40 comprises a manual release lever 42, an electrical switch 43, a battery compartment 44, and internal wiring 46. In use, an operator 100 grasps and pulls the release lever 42 causing a contact closure therefrom the switch 43 and subsequent conduction of an electric current thereto the parachute propellant canister 74 located thereupon a rear portion of the jacket shell 20 via internal wiring 46 (see FIG. 2). Power thereto the release module 40 is supplied by one (1) or more direct current (DC) batteries 47 therewithin the battery compartment 44 which is integral thereto the release module 40. The release lever 42 is envisioned to comprise a forwardly extending oval-shaped metal handle having a pivoting lower hinge 45 and being easily accessed thereby the operator 100 during an emergency.

Figure 6:
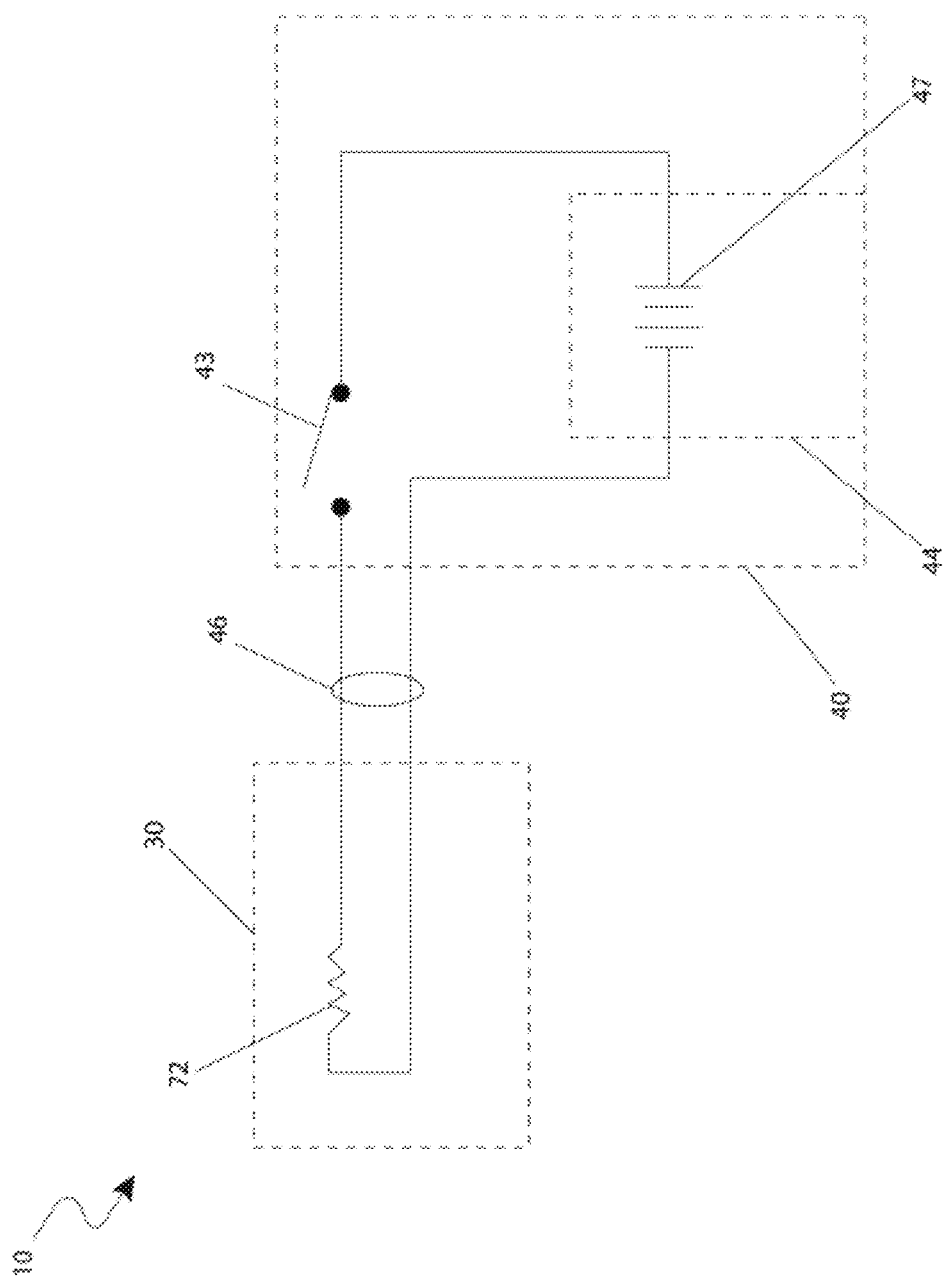
FIG. 6 is an electrical block diagram of the emergency safety jacket 10, according to a preferred embodiment of the present invention.

Referring now to FIG. 6, an electrical block diagram of the emergency safety jacket 10, according to a preferred embodiment of the present invention, is disclosed. The igniter module 72 receives an electrical current upon closure of the manually activated switch 43. Power is provided thereto the simple circuit by one (1) or more disposable or rechargeable batteries 47 therewithin a battery compartment 44 portion of the release module 40. Common copper conductor wiring 46 is utilized to carry the electrical current through the apparatus 10.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 and 2.

The method of utilizing the apparatus 10 may be achieved by performing the following steps: loading a fresh battery 47, or batteries, thereinto the battery compartment 44; installing the sleeve portions 22 thereupon the jacket shell 20 using the sleeve attachment means 24, if not previously installed; placing the jacket shell 20 thereupon a torso of an operator 100 in a normal manner; securing the jacket shell 20 by closing the front zipper 25*a* by pulling the zipper puller 25*b*; latching the buckle closures 26; operating a motorcycle-type vehicle 110 in a normal manner theretoward a destination; grasping and pulling forwardly on the release lever portion 42 which in turn deploys the parachute 37 therefrom the parachute pouch 32 in an event of an emergency which necessitates rear ejection of the operator 100 therefrom the vehicle 110; ejecting the operator 100 therefrom the rear of the vehicle 110 due to rapid deceleration of said operator 100 caused by an air resistance produced by the canopy portion 38 of the parachute 37 wherein the suspension lines 39 are attached thereto the propellant canister 74 at a first end and thereto the canopy 38 at a second end; utilizing the padding and abrasion insert portions 50 of the jacket shell 20 to provide protection thereto the operator 100 upon contact therewith a ground or street surface; and, benefiting from ejection and impact avoidance thereby an operator 100 of a motorcycle-type vehicle 110 as well as providing bodily protection thereto said operator 100 while utilizing the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A safety jacket, comprising:
   a jacket, comprising an adjustable securing means for attachment to a user;
   a parachute assembly mounted thereto a rear portion thereof said jacket;
   a deployment means for deploying said parachute assembly;
   wherein said emergency safety jacket provides protection thereto said user upon forceful ejection therefrom a vehicle;
   wherein said jacket further comprises:
   a jacket shell, comprising a padded garment having a bifurcated front portion and a pair of sleeve attachment portions;
   a pair of sleeves each removably attachable thereto one of said pair of sleeve attachment portions;
   a front closure means with a pull tab for conjoining said bifurcated front portion; and,
   a mounting plate integrally sewn thereinto a rear face of said jacket shell and affixed thereto using a plurality of mounting plate fasteners;
   wherein said jacket shell and said pair of sleeves further comprises a protective material protecting said user from abrasion, fire, and forceful impact;
   wherein said pair of sleeves extend thereto a wrist of said user;
   wherein said front closure means provides a weatherproof securing means of said jacket shell thereto said user; and,
   wherein said parachute assembly is affixed thereto said mounting plate.

2. The safety jacket of claim 1, wherein said protective material comprises at least one of the following list: laminated textiles, basalt fabric, fiberglass cloth, glass wool, foil, stone wool, an inner leather layer, and an outer leather layer.

3. The safety jacket of claim 1, further comprises a plurality of abrasion inserts sewn-in along an external or an internal laminated surface of said jacket shell and said pair of sleeves.

4. The safety jacket of claim 1, wherein said adjustable securing means further comprises a plurality of closure buckles located on opposing outer surfaces thereof said bifurcated front portion thereof said jacket shell;
   wherein said plurality of closure buckles are horizontally configured at equal vertical locations thereon said jacket shell;
   wherein mating of opposing portions thereof said plurality of closure buckles provide maximum closure strength thereto said jacket shell being capable of withstanding anticipated tensile forces thereto said jacket shell resulting from deployment thereof said parachute assembly; and,
   wherein said plurality of closure buckles provides a weatherproof securing means of said jacket shell thereto said user.

5. The safety jacket of claim 1, wherein said parachute assembly further comprises:
   a parachute pouch having an inner surface fastened thereto said mounting plate and said jacket shell thereby said plurality of mounting plate fasteners;
   a plurality of rupture seams located on an outer surface thereof said parachute pouch, comprising weakened intersecting linear regions of a reduced thickness respective thereto a remainder of said parachute pouch;
   a propellant mechanism in electrical communication therewith said deployment means; and,
   a parachute stored therewithin said parachute pouch, comprising a canopy supported by a plurality of suspension lines attached thereto said propellant mechanism deployable thereby said propellant mechanism;
   wherein said parachute comprises dimensions thereby producing a desired air-resistance force so as to decelerate said user.

6. The safety jacket of claim 5, wherein said propellant mechanism further comprises:

a propellant canister comprising a volume of propellant; and, an igniter module portion thereof said propellant canister affixed thereto said mounting plate and in electrical communication therewith said deployment mechanism;

wherein said igniter module ignites said volume of propellant, which produces an expansion of air entering said parachute canopy, which in turn propels said parachute canopy therethrough said plurality of rupture;

wherein said parachute canopy is propelled therein a rearward direction therefrom said user.

7. The safety jacket of claim 6, wherein said volume of propellant is a solid fuel propellant.

8. The safety jacket of claim 5, wherein said deployment mechanism further comprises an electro-mechanical device mounted thereto a chest area of said jacket shell, thereby providing an interface means required to initiate a timely deployment of said parachute assembly.

9. The safety jacket of claim 8, wherein said deployment mechanism further comprises:
   a release lever in mechanical communication therewith an electrical switch;
   a power source in electrical communication therewith said electrical switch;
   wherein said release lever is in an easily grasping location, thereby enabling rapid manipulation thereof; and,
   wherein activation of said release lever closes said switch, thereby conducting an electrical current thereto said propellant mechanism to deploy said parachute.

10. The safety jacket of claim 9, wherein said release lever comprises a forwardly extending oval-shaped handle having a pivoting lower hinge.

11. A safety jacket, comprising:
   a jacket shell, comprising a padded garment having a bifurcated front portion and a pair of sleeve attachment portions, further comprising:
      a front closure means with a pull tab for conjoining said bifurcated front portion;
      a mounting plate integrally sewn thereinto a rear face of said jacket shell and affixed thereto using a plurality of mounting plate fasteners;
      a plurality of closure buckles located on opposing outer surfaces thereof said bifurcated front portion thereof said jacket shell horizontally configured at equal vertical locations thereon said jacket shell; and,
      a pair of sleeves each removably attachable thereto one of said pair of sleeve attachment portions and extending thereto a wrist thereof a user;
      wherein said jacket shell and said pair of sleeves further comprises a protective material protecting said user from abrasion, fire, and forceful impact; and,
      wherein said front closure means and said plurality of closure buckles provide a weatherproof securing means of said jacket shell thereto said user;
      wherein said emergency safety jacket provides protection thereto said user upon forceful ejection therefrom a vehicle; and,
      wherein mating of opposing portions thereof said plurality of closure buckles provide maximum closure strength thereto said jacket shell being capable of withstanding anticipated tensile forces thereto said jacket shell resulting from deployment thereof said parachute assembly;

a parachute assembly, further comprising:
      a parachute pouch having a inner surface fastened thereto said mounting plate and said jacket shell thereby said plurality of mounting plate fasteners;
      a plurality of rupture seams located on an outer surface thereof said parachute pouch, comprising weakened intersecting linear regions of a reduced thickness respective thereto a remainder of said parachute pouch;
      a propellant mechanism; and,
      a parachute stored therewithin said parachute pouch, comprising a canopy supported by a plurality of suspension lines affixed thereto said propellant mechanism; and,
      wherein said parachute comprises dimensions thereby producing a desired air-resistance force so as to decelerate said user;

a deployment means for deploying said parachute, comprising an electro-mechanical device in electrical communication therewith said propellant mechanism mounted thereto a chest area of said jacket shell, thereby providing an interface means required to initiate a timely deployment of said parachute assembly and further comprising:
      a release lever in mechanical communication therewith an electrical switch;
      a power source in electrical communication therewith said electrical switch;
      wherein said release lever is in an easily grasping location, thereby enabling rapid manipulation thereof; and,
      wherein activation of said release lever closes said switch, thereby conducting an electrical current thereto said propellant mechanism to deploy said parachute.

12. The safety jacket of claim 11, wherein said protective material comprises at least one of the following list: laminated textiles, basalt fabric, fiberglass cloth, glass wool, foil, stone wool, an inner leather layer, and an outer leather layer.

13. The safety jacket of claim 11, further comprises a plurality of abrasion inserts sewn-in along an external or an internal laminated surface of said jacket shell and said pair of sleeves.

14. The safety jacket of claim 11, wherein said propellant mechanism further comprises:
   a propellant canister comprising a volume of propellant; and,
   an igniter module portion thereof said propellant canister affixed thereto said mounting plate and in electrical communication therewith said deployment mechanism;
   wherein said igniter module ignites said volume of propellant, which produces an expansion of air entering said parachute canopy, which in turn propels said parachute canopy therethrough said plurality of rupture;
   wherein said parachute canopy is propelled therein a rearward direction therefrom said user.

15. The safety jacket of claim 14, wherein said volume of propellant is a solid fuel propellant.

16. The safety jacket of claim 11, wherein said release lever comprises a forwardly extending oval-shaped handle having a pivoting lower hinge.

* * * * *